(12) United States Patent
Chandrasekhara

(10) Patent No.: US 10,599,255 B2
(45) Date of Patent: Mar. 24, 2020

(54) INPUT PROCESSING FOR COMPUTING DEVICES WITH ON-SCREEN AND OFF-SCREEN INPUTS

(71) Applicant: Intel Corporation, Santa Clara, CA (US)

(72) Inventor: Vinaya Kumar Chandrasekhara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 15/856,909

(22) Filed: Dec. 28, 2017

(65) Prior Publication Data

US 2019/0042048 A1 Feb. 7, 2019

(51) Int. Cl.
*G06F 3/041* (2006.01)
*G06F 3/0354* (2013.01)
*G06F 3/0488* (2013.01)
*G06F 3/02* (2006.01)
*G06F 1/16* (2006.01)

(52) U.S. Cl.
CPC .......... *G06F 3/0416* (2013.01); *G06F 1/1616* (2013.01); *G06F 1/1654* (2013.01); *G06F 3/02* (2013.01); *G06F 3/0227* (2013.01); *G06F 3/03545* (2013.01); *G06F 3/03547* (2013.01); *G06F 3/04886* (2013.01); *G06F 2203/0384* (2013.01)

(58) Field of Classification Search
CPC .... G06F 3/0416; G06F 1/1616; G06F 1/1654; G06F 3/02; G06F 3/0227; G06F 3/03545; G06F 3/04886; G06F 2203/0384; G06F 2203/0382; G06F 2203/0383; G06F 2203/0381
See application file for complete search history.

(56) References Cited

U.S. PATENT DOCUMENTS

2014/0101576 A1* 4/2014 Kwak ................... G06F 3/0482 715/761
2018/0143703 A1* 5/2018 Fleck ................... G06F 3/0346

* cited by examiner

*Primary Examiner* — Robert J Michaud
(74) *Attorney, Agent, or Firm* — Schwabe, Williamson & Wyatt, P.C.

(57) ABSTRACT

Embodiments include apparatuses, methods, and systems for computing. An apparatus may include a display screen of a computing device, and an on-screen input interface controller co-located with the display screen. The apparatus may also include a receiver co-located with the display screen to wirelessly receive an off-screen input from an off-screen input support device of the computing device. The off-screen input support device may be separately located from the display screen. The on-screen input interface controller may process an on-screen input provided via an interaction between an on-screen input device and the display screen. In addition, the on-screen input interface controller may further process the off-screen input received by the receiver. Other embodiments may also be described and claimed.

25 Claims, 8 Drawing Sheets

INPUT PROCESSING FOR COMPUTING DEVICES WITH ON-SCREEN AND OFF-SCREEN INPUTS

FIELD

Embodiments of the present invention relate generally to the technical fields of computing, and more particularly to input processing for computing devices with on-screen and off-screen inputs.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device, e.g., a desktop or laptop computer, a smartphone, a tablet, a detachable 2-in-1 device, or an embedded device, may be a general-purpose device that can accept software for many purposes and applications, or a dedicated device designed for a specific application. A computing device may include various components, e.g., a logic unit, a control unit, memory, and input and output devices (collectively termed I/O). Multiple I/O devices, such as a display screen, an on-screen input device, e.g., a stylus, or an off-screen input device, e.g., a keyboard, may be included or coupled to a computing device. Sometimes, multiple I/O devices may be coupled to a computing device by wires, which may be expensive to make, and not convenient to use.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
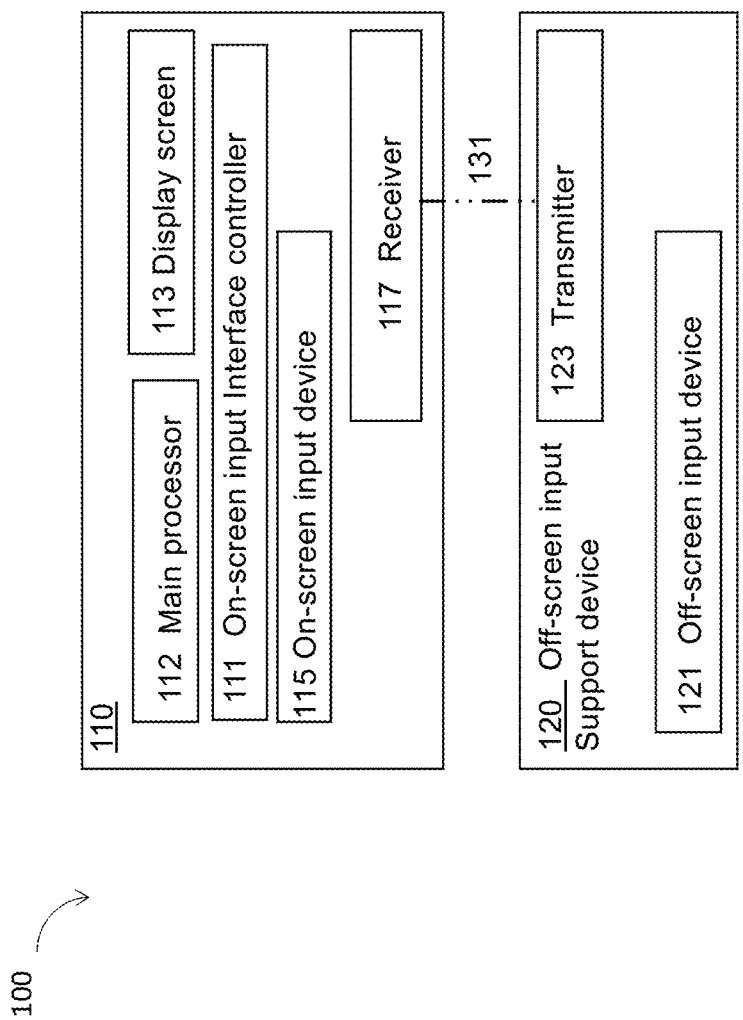
FIG. 1 illustrates an example apparatus for computing including a computing device having an on-screen input interface controller to receive an on-screen input from an on-screen input device, and also an off-screen input from an off-screen input support device, in accordance with various embodiments.

Sometimes, multiple input and output (I/O) devices may be included or coupled to a computing device by wires, which may be expensive to make, and not convenient to use. For example, a detachable 2 in 1 device may connect a tablet and a keyboard using pogo-pins or wire connectors. Such connections may have negative impacts on user experiences of the 2-in-1 device, e.g., not convenient to use, not aesthetical appealing. There has been interest in reducing the number of pogo-pins or eliminating the use of pogo-pins. For example, Apple iPad Pro's Smart Keyboard may have reduced the number of pogo-pins from five to six as normally used in a detachable 2-in-1 device to about three. Similarly, Google Pixel C may provide wireless charging and Bluetooth capability. However, the current solutions may be expensive, which may have limited their applications. A better design would benefit computing devices such as detachable 2 in 1 devices, which may be an important and growing market segment in the personal computing (PC) industry.

Embodiments herein may present a computing device including a display screen. An on-screen input interface controller may be co-located with the display screen to receive and process an on-screen input from an on-screen input device, and also wirelessly receive an off-screen input from an off-screen input support device. By using one on-screen input interface controller to handle both on-screen input and off-screen input, the cost for the computing device may be reduced in addition to cut the number of wired connections. The computing device may be a detachable 2 in 1 device, other general computing device, or a dedicated device.

In embodiments, an apparatus for computing may include a display screen of a computing device, and an on-screen input interface controller co-located with the display screen. The apparatus may also include a receiver co-located with the display screen to wirelessly receive an off-screen input from an off-screen input support device of the computing device. The off-screen input support device may be separately located from the display screen. The on-screen input interface controller may process an on-screen input provided via an interaction between an on-screen input device and the display screen. In addition, the on-screen input interface controller may further process the off-screen input received by the receiver.

In embodiments, an apparatus for computing may include an off-screen input device and a transmitter coupled to the off-screen input device. The off-screen input device may generate an off-screen input for a computing device, where the off-screen input device may be separately located from a display screen of the computing device. The transmitter may wirelessly transmit the off-screen input to a receiver co-located with the display screen to receive the off-screen input, where the off-screen input is to be processed by an on-screen input interface controller co-located with the display screen of the computing device.

In embodiments, an apparatus for computing may include an on-screen input interface controller co-located with a display screen of a computing device, and a virtual device interface to operate on the on-screen input interface controller. The virtual device interface may process an on-screen input provided via an interaction between an on-screen input device and the display screen; and further process an off-screen input provided by an off-screen input support device of the computing device, separately located from the display screen.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

Some embodiments may be used in conjunction with various devices and systems, for example, a communication system, a communication device, a wireless communication system, a wireless communication device, a wired communication device, a wired communication system, a personal computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless modem, a video device, an audio device, an audio-video (AN) device, a wired or wireless network, a wireless area network, a wireless video area network (WVAN), a local area network (LAN), a wireless LAN (WLAN), a personal area network (PAN), a wireless PAN (WPAN), a wireless wide area network (WWAN), and the like.

Some embodiments may be used in conjunction with devices and/or networks operating in accordance with existing web real-time communication standards, IEEE 802.11 standards, wireless-gigabit-alliance (WGA) specifications, wireless fidelity (WiFi) alliance (WFA) peer-to-peer (P2P) specifications, 3rd generation partnership project (3GPP), 3GPP long term evolution (LTE), any current and/or future versions and/or derivatives thereof, and the like.

Some embodiments may be used in conjunction with one way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation, discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other wired and/or wireless devices, systems and/or networks.

The term "wireless device," as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "communication device", as used herein, includes, for example, a device capable of wireless and/or wired communication, a communication device capable of wireless and/or wired communication, a communication station capable of wireless and/or wired communication, a portable or non-portable device capable of wireless and/or wired communication, or the like. In some embodiments, a communication device may be or may include a peripheral that is integrated with a computer, or a peripheral that is attached to a computer.

FIG. 1 illustrates an example apparatus 100 for computing including a computing device 110 having an on-screen input interface controller 111 to receive an on-screen input from an on-screen input device 115, and also an off-screen input from an off-screen input support device 120, in accordance with various embodiments. For clarity, features of the apparatus 100, the computing device 110, the on-screen input interface controller 111, the on-screen input device 115, and the off-screen input support device 120 may be described below as an example for understanding an example apparatus for computing including a computing device having an on-screen input interface controller to receive an on-screen input from an on-screen input device, and also an off-screen input from an off-screen input support device. It is to be understood that there may be more or fewer components included in the apparatus 100, the computing device 110, the on-screen input interface controller 111, the on-screen input device 115, and the off-screen input support device 120. Further, it is to be understood that one or more of the devices and components within the apparatus 100, the computing device 110, the on-screen input interface controller 111, the on-screen input device 115, and the off-screen input support device 120 may include additional and/or varying features from the description below, and may include any devices and components that one having ordinary skill in the art would consider and/or refer to as the devices and components of an apparatus for computing including a computing device having an on-screen input interface controller to receive an on-screen input from an on-screen input device, and also an off-screen input from an off-screen input support device.

In embodiments, the apparatus 100 may include the computing device 110 and the off-screen input support device 120. The computing device 110 may include the on-screen input interface controller 111, a display screen 113, the on-screen input device 115, a receiver 117, and a main processor 112. The main processor 112 may perform computations for the apparatus 100 based on various inputs. The on-screen input interface controller 111 and the receiver 117 may be co-located with the display screen 113. The off-screen input support device 120 may be separately located from the display screen 113. The off-screen input support device 120 may include an off-screen input device 121 and a transmitter 123. In some embodiments, a second off-screen input device, not shown, may be included in the off-screen input support device 120.

In embodiments, the transmitter 123 and the receiver 117 may communicate in accordance with a wireless protocol 131. The wireless protocol 131 may be selected from one of a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, a dedicated short range communications (DSRC) protocol, or a wireless universal serial bus (USB) protocol.

In embodiments, an interaction between the on-screen input device 115 and the display screen 113 may generate an on-screen input. The on-screen input device 115 may be a selected one of a user finger, a stylus, or a virtual keyboard. The off-screen input device 121 may be a keyboard, a trackpad, a mouse, a track ball, a joy stick, or another display screen removably coupled with the display screen. The off-screen input device 121 may generate an off-screen input. The transmitter 123 may be coupled to the off-screen input device 121 to wirelessly transmit the off-screen input to the receiver 117, and the receiver 117 may wirelessly receive the off-screen input from the transmitter 123. Since the transmitter 123 and the receiver 117 may communicate through various wireless communication protocols, there may not be any wired connections between the computing device 110 and the off-screen input support device 120. Additionally and alternatively, there may be some wires between the computing device 110 and the off-screen input support device 120 for functions such as power.

In embodiments, the on-screen input interface controller 111 may process an on-screen input provided via an interaction between the on-screen input device 115 and the display screen 113. In addition, the on-screen input interface controller 111 may also process the off-screen input received by the receiver 117. In embodiments, the on-screen input interface controller 111 may receive or process in a first time slot or a first frequency the on-screen input from the on-screen input device 115, and receive or process in a second time slot or a second frequency the off-screen input from the off-screen input support device 120 and received by the receiver 117. By using the on-screen input interface controller 111 to process both an on-screen input and an off-screen input, the apparatus 100 may be made with less cost, and improved user experiences.

In embodiments, the apparatus 100 may be a detachable 2 in 1 device including at least the computing device 110, the display screen 113, the on-screen input interface controller 111, and the receiver 117. The computing device 110 may be a computing tablet. In some other embodiments, the apparatus 100 may be an embedded computing device with the display screen 113, the on-screen input device 115, and the on-screen input interface controller 111 that may further receive an off-screen input from an additional off-screen input support device. The display screen 113 may be a selected one of a resistive touchscreen, a capacitive touchscreen, an infrared touchscreen, an optical touchscreen, a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Figure 2:
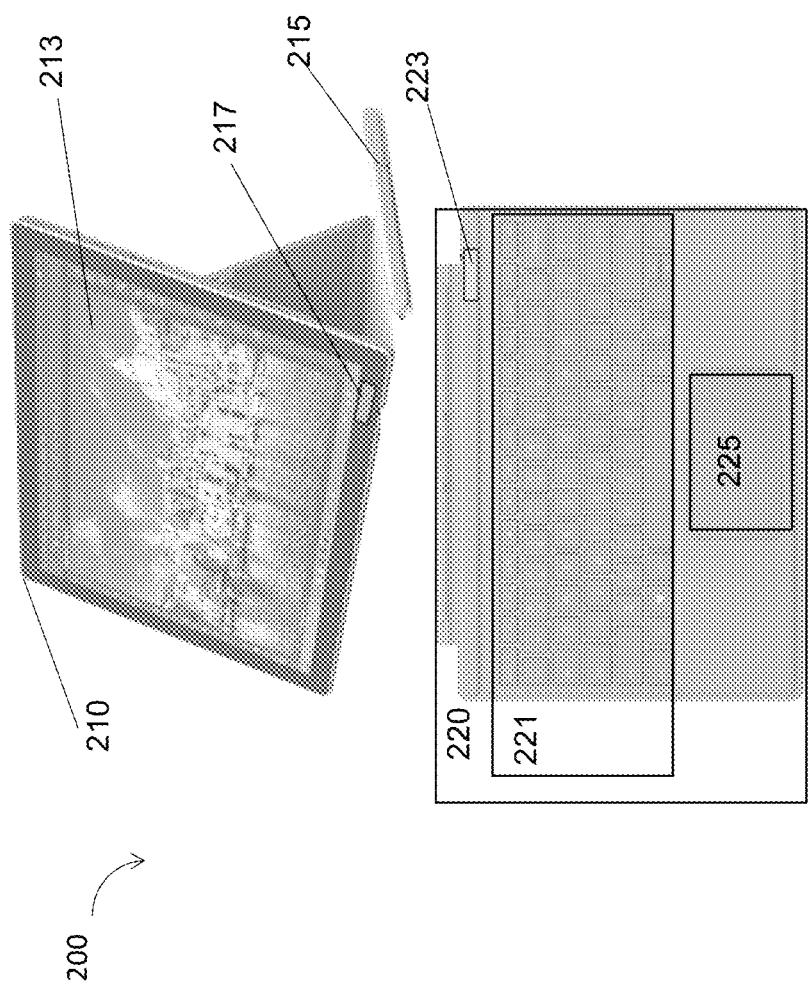
FIG. 2 illustrates another example apparatus for computing including a computing device having an on-screen input interface controller to receive an on-screen input from an on-screen input device, and also an off-screen input from an off-screen input support device, in accordance with various embodiments.

FIG. 2 illustrates another example apparatus 200 for computing including a computing device 210 having an on-screen input interface controller to receive an on-screen input from an on-screen input device 215, and also an off-screen input from an off-screen input support device 220, in accordance with various embodiments. In embodiments, the apparatus 200, the computing device 210, the off-screen input support device 220, and the on-screen input device 215, may be examples of the apparatus 100, the computing device 110, the off-screen input support device 120, and the on-screen input device 115, respectively.

In embodiments, the apparatus 200 may include the computing device 210 and the off-screen input support device 220. The apparatus 200 may be a detachable 2 in 1 device, and the computing device 210 may be a computing tablet. The computing device 210 may include a display screen 213, a receiver 217 co-located with the display screen 213, and the on-screen input device 215. The receiver 217 may be a sensing element. The on-screen input device 215 may be a stylus. An on-screen input may be generated by pointing the stylus to be in contact with a location of the display screen 213. There may be a main processor and an on-screen input interface controller, not shown, co-located with the display screen 213 of the computing device 210.

The off-screen input support device 220 may be a keyboard base separately located from the display screen 213. The off-screen input support device 220 may include an off-screen input device 221 and a transmitter 223. The off-screen input support device 220 may include a second off-screen input device 225. The transmitter 223 may also be a sensing element capacitively coupled to the receiver 217. The off-screen input device 221 may be a keyboard, and the second off-screen input device 225 may be a trackpad. The off-screen input device 221 may generate an off-screen input by any key of the keyboard being pressed. The second off-screen input device 225 may generate an off-screen input by moving a position in the trackpad.

In embodiments, an interaction between the on-screen input device 215 and the display screen 213 may generate an on-screen input. The off-screen input device 221 may generate an off-screen input, while the second off-screen input device 225 may generate another off-screen input. The transmitter 223 may transmit the off-screen input generated by the off-screen input device 221 or by the second off-screen input device 225 to the receiver 217 through capacitive coupling between the transmitter 223 and the receiver 217. The receiver 217 may receive an off-screen input from the transmitter 223 through capacitive coupling between the transmitter 223 and the receiver 217. Both the on-screen input, and the one or more off-screen inputs may be processed by an on-screen input interface controller, not shown, co-located with the display screen 213 of the computing device 210.

Figure 3:
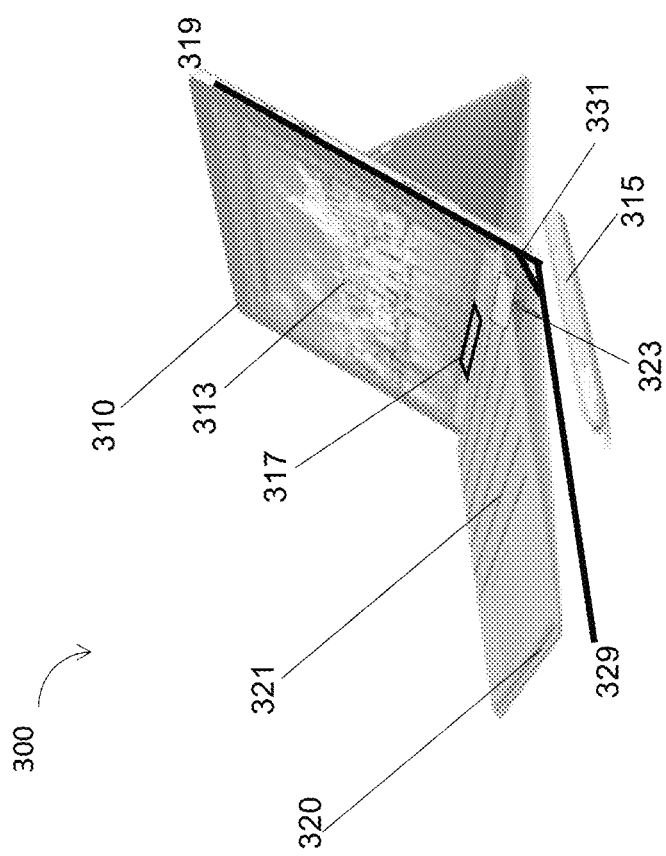
FIG. 3 illustrates another example apparatus for computing including a computing device having an on-screen input interface controller to receive an on-screen input from an on-screen input device, and also an off-screen input from an off-screen input support device, in accordance with various embodiments.

FIG. 3 illustrates another example apparatus 300 for computing including a computing device 310 having an on-screen input interface controller to receive an on-screen input from an on-screen input device 315, and also an off-screen input from an off-screen input support device 320, in accordance with various embodiments. In embodiments, the apparatus 300, the computing device 310, the off-screen input support device 320, and the on-screen input device 315, may be examples of the apparatus 100, the computing device 110, the off-screen input support device 120, and the on-screen input device 115, respectively. Similarly, the apparatus 300, the computing device 310, the off-screen input support device 320, and the on-screen input device 315, may be examples of the apparatus 200, the computing device 210, the off-screen input support device 220, and the on-screen input device 215, respectively. In some embodiments, the apparatus 300 may be the same as the apparatus 200 in a docked condition.

In embodiments, the apparatus 300 may include the computing device 310 and the off-screen input support device 320. The apparatus 300 may be a detachable 2 in 1 device, and the computing device 310 may be a computing tablet. The computing device 310 may include a display screen 313, the on-screen input device 315, and a receiver 317 co-located with the display screen 313. The on-screen input device 315 may be a stylus. The off-screen input support device 320 may be a keyboard base separately located from the display screen 313. The off-screen input support device 320 may include an off-screen input device 321 and a transmitter 323. The off-screen input device 321 may be a keyboard.

In embodiments, the transmitter 323 may be a touch sensing element located in a location of the off-screen input support device 320 to control a capacitance of the touch sensing element by a tilting degree of the off-screen input support device 320 with respect to the computing device 310. For example, the tilting degree of the off-screen input support device 320 with respect to the computing device 310 may be represented by a degree 331 formed by an edge 329 of the off-screen input support device 320, and an edge 319 of the computing device 310. The change of the degree 331 may affect the distance between the transmitter 323 and the receiver 317, and hence controlling a capacitance of the transmitter 323 and the receiver 317, which are two touch sensing elements. For example, placements of the two sensing elements, e.g., the transmitter 323 and the receiver 317, may be chosen such that the two sensing elements may have sufficient capacitance for operation in normal modes, and may lose the capacitance when the off-screen input support device 320, e.g., a keyboard base, may be tilted beyond a predetermined angle for operation. Such a design may help making and breaking the interfaces by usage scenarios to avoid unwanted off-screen inputs, e.g., key entries, without any additional hardware.

Figure 4:
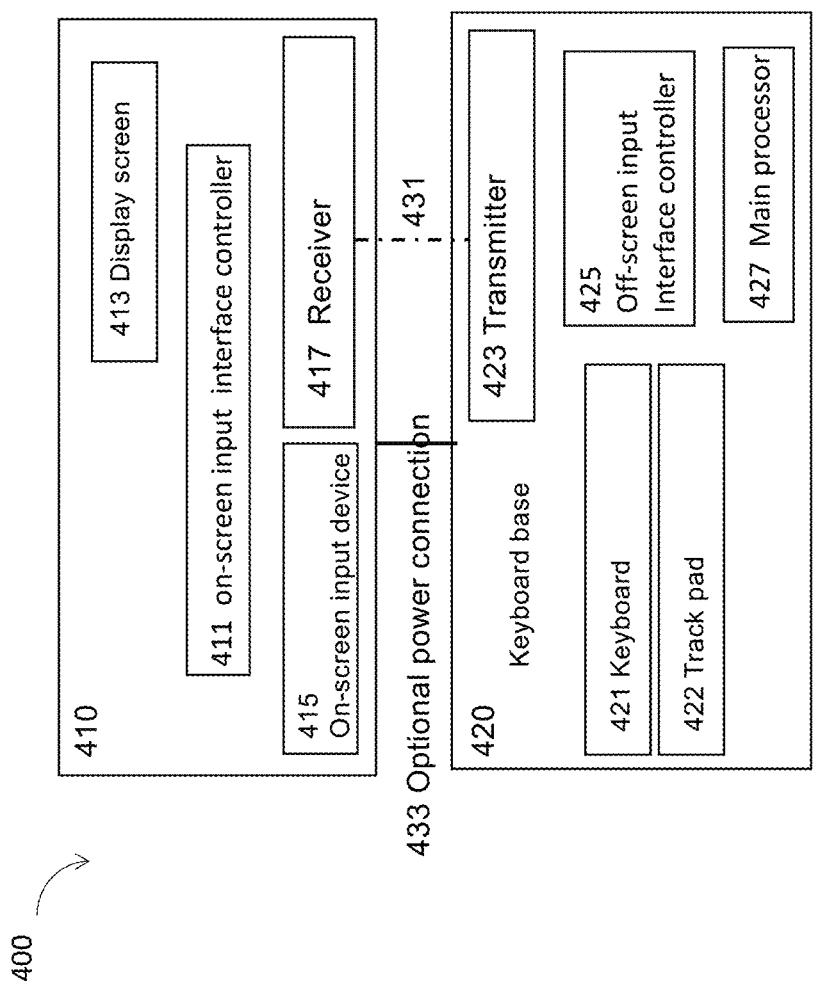
FIG. 4 illustrates another example apparatus for computing including a computing device having an on-screen input interface controller to receive an on-screen input from an on-screen input device, and also an off-screen input from an off-screen input support device, in accordance with various embodiments.

FIG. 4 illustrates another example apparatus 400 for computing including a computing device 410 having an on-screen input interface controller 411 to receive an on-screen input from an on-screen input device 415, and also an off-screen input from an off-screen input support device 420, in accordance with various embodiments. In embodiments, the apparatus 400, the computing device 410, the off-screen input support device 420, the on-screen input interface controller 411, and the on-screen input device 415, may be examples of the apparatus 100, the computing device 110, the off-screen input support device 120, the on-screen input interface controller 111, and the on-screen input device 115, respectively. Similarly, the apparatus 400, the computing device 410, the off-screen input support device 420, and the on-screen input device 415, may be examples of the apparatus 200, the computing device 210, the off-screen input support device 220, and the on-screen input device 215, respectively.

In embodiments, the apparatus 400 may include the computing device 410 and the off-screen input support device 420, which may be coupled by a wired connection 433. The wired connection 433 may be for power delivery between the computing device 410 and the off-screen input support device 420. The computing device 410 may include a display screen 413, the on-screen input device 415, the on-screen input interface controller 411, and a receiver 417 co-located with the display screen 413. The off-screen input support device 420 may be a keyboard base separately located from the display screen 413. The off-screen input support device 420 may include a transmitter 423, an off-screen input device 421, another off-screen input device 422, and a main processor 427. The off-screen input device 421 may be a keyboard, while another off-screen input device 422 may be a track pad. The transmitter 423 and the receiver 417 may communicate in accordance with a wireless protocol 431. The main processor 427 may be coupled to the off-screen input device 421, and another off-screen input device 422, and perform computations for the apparatus 400 based on various inputs.

In addition, the off-screen input support device 420 may further include an off-screen input interface controller 425 coupled to the transmitter 423, the off-screen input device 421, and another off-screen input device 422. The off-screen input interface controller 425 may generate the off-screen input compatible to the on-screen input, which is to be transmitted by the transmitter 423 to the receiver 417. Furthermore, the on-screen input interface controller 411 may process an on-screen input provided via an interaction between the on-screen input device 415 and the display screen 413. In addition, the on-screen input interface controller 411 may also process the off-screen input generated by the off-screen input interface controller 425 and received by the receiver 417.

Figure 5:
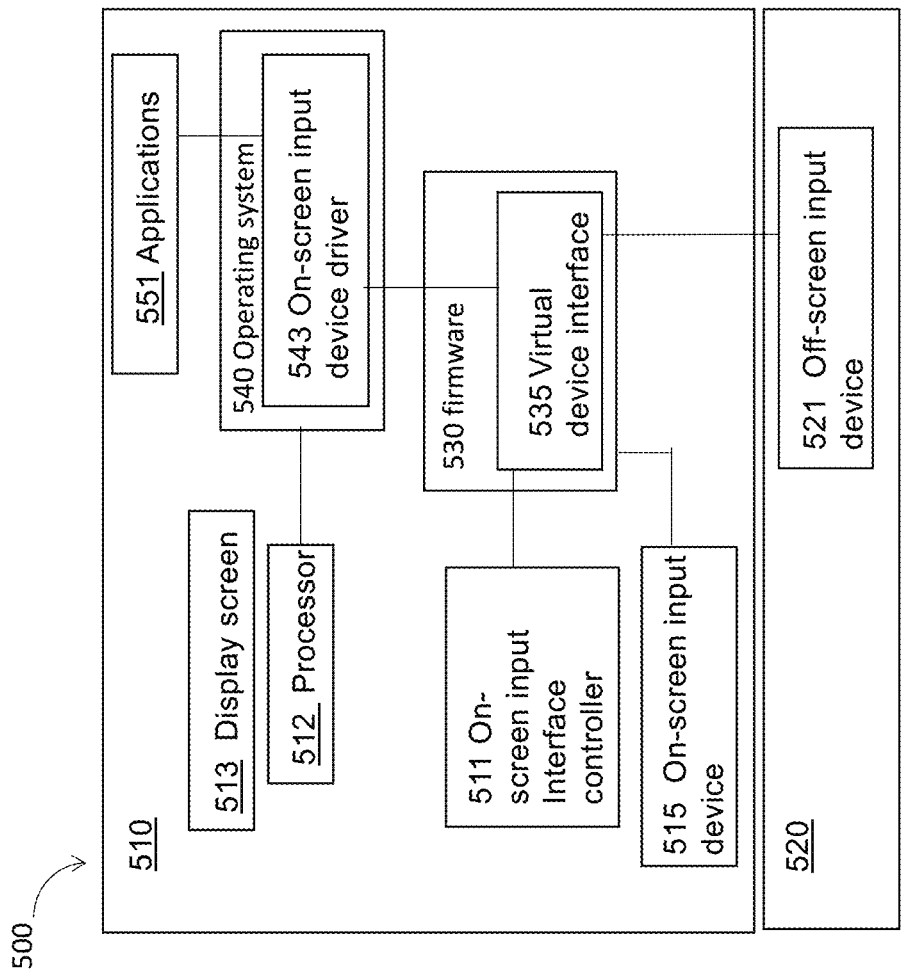
FIG. 5 illustrates another example apparatus for computing including a computing device having an on-screen input interface controller to receive an on-screen input from an on-screen input device, and also an off-screen input from an off-screen input support device, in accordance with various embodiments.

FIG. 5 illustrates another example apparatus 500 for computing including a computing device 510 having an on-screen input interface controller 511 to receive an on-screen input from an on-screen input device 515, and also an off-screen input from an off-screen input support device 520, in accordance with various embodiments. In embodiments, the apparatus 500, the computing device 510, the off-screen input support device 520, the on-screen input interface controller 511, and the on-screen input device 515, may be examples of the apparatus 100, the computing device 110, the off-screen input support device 120, the on-screen input interface controller 111, and the on-screen input device 115, respectively. In addition to the hardware components, the apparatus 500 may illustrate some functional components as well.

In embodiments, the apparatus 500 may include the computing device 510 and the off-screen input support device 520. The computing device 510 may include a display screen 513, the on-screen input device 515, the on-screen input interface controller 511, and a processor 512. The off-screen input support device 520 may be separately located from the display screen 513, and may include an off-screen input device 521. In addition, the computing device 510 may include a receiver, and the off-screen input support device 520 may include a transmitter to communicate with the receiver in accordance with a wireless protocol, not shown.

In addition to the hardware components, the computing device 510 may include various software components, e.g., a firmware 530, an operating system 540, and applications 551 running on the on-screen input interface controller 511 and the processor 512. The firmware 530 may include a virtual device interface 535 to operate on the on-screen input interface controller 511. The operating system 540 may include an on-screen input device driver 543 to operate on the processor 512. The virtual device interface 535 may process an on-screen input provided via an interaction between the on-screen input device 515 and the display screen 513. In addition, the virtual device interface 535 may process an off-screen input provided by the off-screen input support device 520. The virtual device interface 535 may process the on-screen input in a first time slot or a first frequency, and process the off-screen input in a second time slot or a second frequency.

Figure 6:
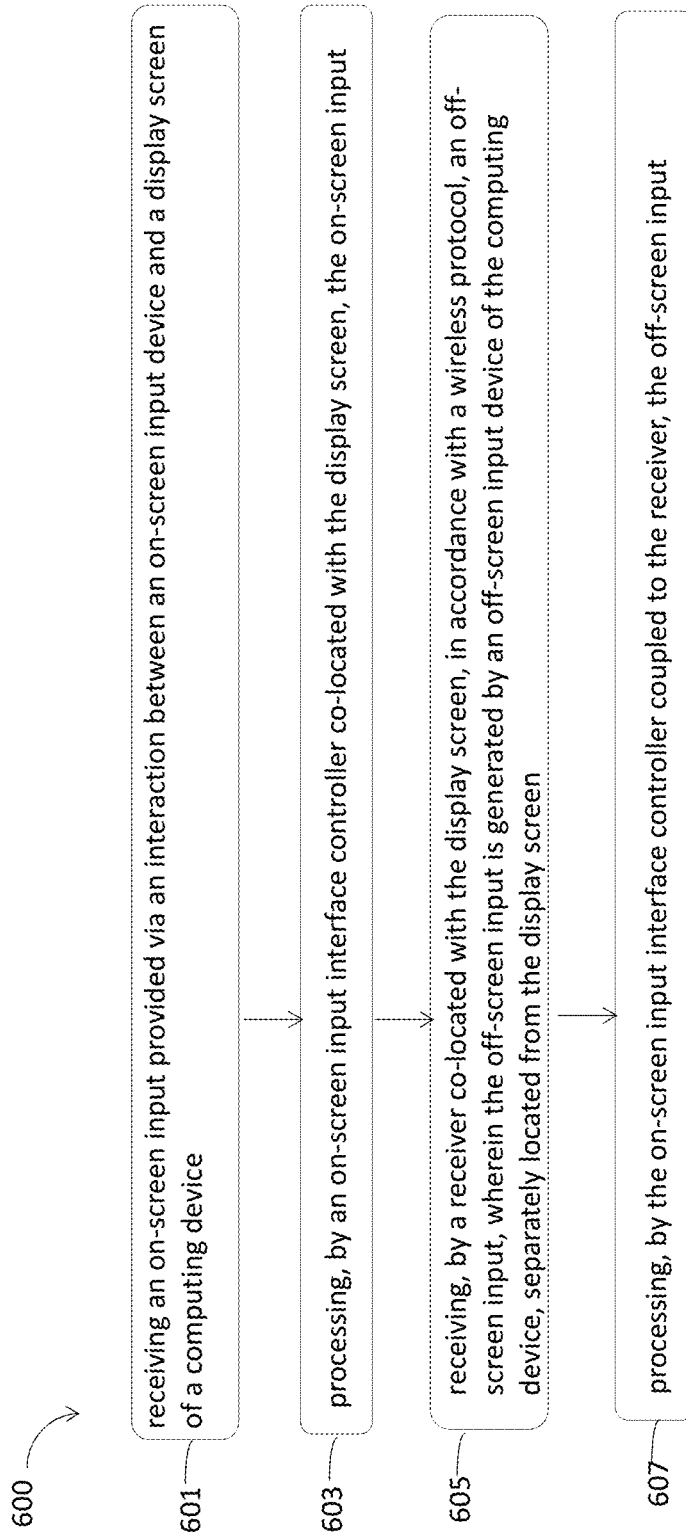
FIG. 6 illustrates an example process for an on-screen input interface controller to receive an on-screen input from an on-screen input device, and also an off-screen input from an off-screen input support device, in accordance with various embodiments.

FIG. 6 illustrates an example process 600 for an on-screen input interface controller to receive an on-screen input from an on-screen input device, and also an off-screen input from an off-screen input support device, in accordance with various embodiments. In embodiments, the process 600 may be a process performed by the on-screen input interface controller 111 in FIG. 1, the on-screen input interface controller 411 in FIG. 4, or the on-screen input interface controller 511 in FIG. 5.

The process 600 may start at an interaction 601. During the interaction 601, an on-screen input may be received, where the on-screen input may be provided via an interaction between an on-screen input device and a display screen of a computing device. For example, during the interaction 601, an on-screen input may be received, where the on-screen input may be provided via an interaction between the on-screen input device 115 and the display screen 113 of the computing device 110.

During an interaction 603, the on-screen input may be processed by an on-screen input interface controller co-located with the display screen. For example, during the interaction 603, the on-screen input may be processed by the on-screen input interface controller 111 co-located with the display screen 113.

During an interaction 605, an off-screen input may be received by a receiver co-located with the display screen in accordance with a wireless protocol, where the off-screen input may be generated by an off-screen input device of the computing device separately located from the display screen. For example, during the interaction 605, an off-screen input may be received by the receiver 117 co-located with the display screen 113 in accordance with the wireless protocol 131, where the off-screen input may be generated by the off-screen input device 121 of the computing device separately located from the display screen 113.

During an interaction 607, the off-screen input may be processed by the on-screen input interface controller coupled to the receiver. For example, during the interaction 607, the off-screen input may be processed by the on-screen input interface controller 111 coupled to the receiver 117.

Figure 7:
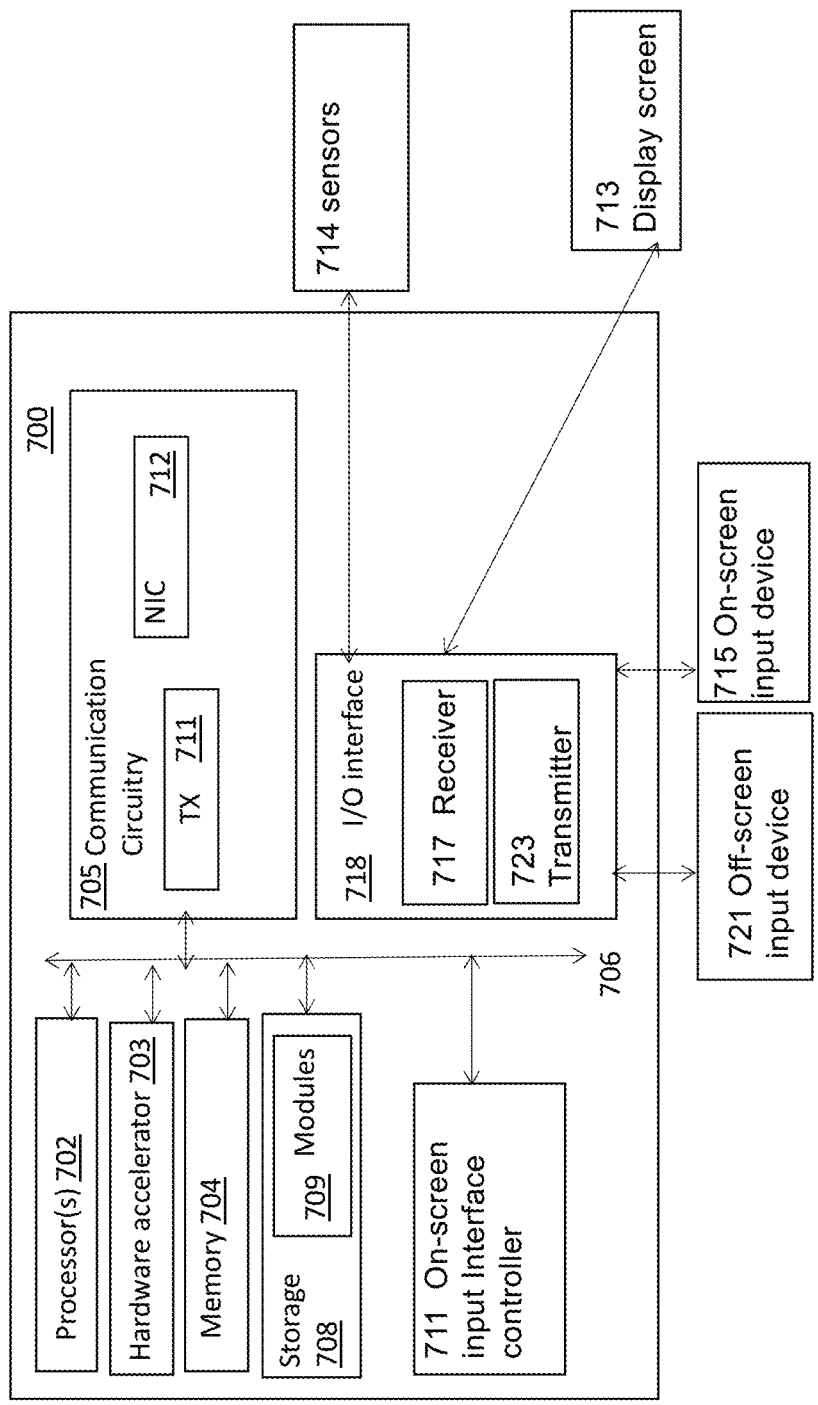
FIG. 7 illustrates an example device suitable for use to practice various aspects of the present disclosure, in accordance with various embodiments.

FIG. 7 illustrates an example device suitable for use to practice various aspects of the present disclosure, in accordance with various embodiments. The device 700 may be used to implement functions of the apparatus 100, the apparatus 200, the apparatus 300, the apparatus 400, or the apparatus 500. As shown, the device 700 may include one or more processors 702, each having one or more processor cores, or and optionally, a hardware accelerator 703 (which may be an ASIC or a FPGA). In alternate embodiments, the hardware accelerator 703 may be part of processor 702, or integrated together on a SOC. Additionally, the device 700 may include a memory 704, which may be any one of a number of known persistent storage medium, and a data storage circuitry 708 including modules 709. In addition, the 700 may include an I/O interface 718, coupled to one or more sensors 714. Furthermore, the device 700 may include communication circuitry 705 including a transceiver (Tx) 711, and network interface controller (NIC) 712. The elements may be coupled to each other via system bus 706, which may represent one or more buses. In the case of multiple buses, they may be bridged by one or more bus bridges (not shown).

In addition, the device 700 may include a display screen 713, an on-screen input device 715, an on-screen input interface controller 711, and an off-screen input device 721. Furthermore, the I/O interface 718 may include a transmitter 723 and a receiver 717. In embodiments, the display screen 713, the on-screen input device 715, the on-screen input interface controller 711, the off-screen input device 721, the transmitter 723, and the receiver 717 may be similar to the corresponding components, e.g., the display screen 113, the on-screen input device 115, the on-screen input interface controller 111, the off-screen input device 121, the transmitter 123, and the receiver 117, as shown in FIG. 1.

In embodiments, the processor(s) 702 (also referred to as "processor circuitry 702") may be one or more processing elements configured to perform basic arithmetical, logical, and input/output operations by carrying out instructions. Processor circuitry 702 may be implemented as a standalone system/device/package or as part of an existing system/device/package. The processor circuitry 702 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 702 may be a part of a SoC in which the processor circuitry 702 and other components discussed herein are formed into a single IC or a single package. As examples, the processor circuitry 702 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm snapdragon® processor(s); Samsung Exynos® processor(s); and/or the like.

In embodiments, the processor circuitry 702 may include a sensor hub, which may act as a coprocessor by processing data obtained from the one or more sensors 714. The sensor hub may include circuitry configured to integrate data obtained from each of the one or more sensors 714 by performing arithmetical, logical, and input/output operations. In embodiments, the sensor hub may capable of timestamping obtained sensor data, providing sensor data to the processor circuitry 702 in response to a query for such data, buffering sensor data, continuously streaming sensor data to the processor circuitry 702 including independent streams for each sensor of the one or more sensors 714, reporting sensor data based upon predefined thresholds or conditions/triggers, and/or other like data processing functions.

In embodiments, the memory 704 (also referred to as "memory circuitry 704" or the like) may be circuitry configured to store data or logic for operating the computer device 700. The memory circuitry 704 may include number of memory devices may be used to provide for a given amount of system memory. As examples, the memory circuitry 704 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 704 may include one or more mass-storage devices, such as a solid state disk drive (SSDD); flash memory cards, such as SD cards, microSD cards, xD picture cards, and the like, and USB flash drives; on-die memory or registers associated with the processor circuitry 702 (for example, in low power implementations); a micro hard disk drive (HDD); three dimensional cross-point (3D XPOINT) memories from Intel® and Micron®, etc.

Where FPDs are used, the processor circuitry 702 and memory circuitry 704 (and/or data storage circuitry 708) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 702 to implement various logic functions. The memory cells may include any combination of various levels of memory/storage including, but not limited to, EPROM, EEPROM, flash memory, SRAM, anti-fuses, etc.

In embodiments, the data storage circuitry 708 (also referred to as "storage circuitry 708" or the like), with shared or respective controllers, may provide for persistent storage of information such as modules 709, operating systems, etc. The data storage circuitry 708 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 702; hard disk drives (HDDs); micro HDDs; resistance change memories; phase change memories; holographic memories; or chemical memories; among others. As shown, the data storage circuitry 708 is included in the computer device 700; however, in other embodiments, the data storage circuitry 708 may be implemented as one or more devices separated from the other elements of computer device 700.

In some embodiments, the data storage circuitry 708 may include an operating system (OS) (not shown), which may be a general purpose operating system or an operating system specifically written for and tailored to the computer device 700. The OS may include one or more drivers, libraries, and/or application programming interfaces (APIs), which provide program code and/or software components for modules 709 and/or control system configurations to control and/or obtain/process data from the one or more sensors 714.

The modules 709 may be software modules/components used to perform various functions of the computer device 700 and/or to carry out functions of the example embodiments discussed herein. In embodiments where the processor circuitry 702 and memory circuitry 704 includes hardware accelerators (e.g., FPGA cells, the hardware accelerator 703) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 709 may comprise logic for the corresponding entities discussed with regard to the display screen 713, the on-screen input device 715, the on-screen input interface controller 711, the off-screen input device 721, the transmitter 723, and the receiver 717.

The components of computer device 700 may communicate with one another over the bus 706. The bus 706 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 706 may be a controller area network (CAN) bus system, a Time-Trigger Protocol (TTP) system, or a FlexRay system, which may allow various devices (e.g., the one or more sensors 714, etc.) to communicate with one another using messages or frames.

The communications circuitry 705 may include circuitry for communicating with a wireless network or wired network. For example, the communication circuitry 705 may include transceiver (Tx) 711 and network interface controller (NIC) 712. Communications circuitry 705 may include one or more processors (e.g., baseband processors, modems, etc.) that are dedicated to a particular wireless communication protocol.

NIC 712 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 712 may be included to allow connect to a second network (not shown) or other devices, for example, a first NIC 712 providing communications to the network 150 over Ethernet, and a second NIC 712 providing communications to other devices over another type of network, such as a personal area network (PAN) including a personal computer (PC) device. In some embodiments, the various components of the device 700, such as the one or more sensors 714, etc. may be connected to the processor(s) 702 via the NIC 712 as discussed above rather than via the I/O circuitry 718 as discussed infra.

The Tx 711 may include one or more radios to wirelessly communicate with a network and/or other devices. The Tx 711 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 700. In some embodiments, the various components of the device 700, such as the one or more sensors 714, etc. may be connected to the device 700 via the Tx 711 as discussed above rather than via the I/O circuitry 718 as discussed infra. In one example, the one or more sensors 714 may be coupled with device 700 via a short range communication protocol.

The Tx 711 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 718 may include circuitry, such as an external expansion bus (e.g., Universal Serial Bus (USB), FireWire, Thunderbolt, PCI/PCIe/PCIx, etc.), used to connect computer device 700 with external components/devices, such as one or more sensors 714, etc. I/O interface circuitry 718 may include any suitable interface controllers and connectors to interconnect one or more of the processor circuitry 702, memory circuitry 704, data storage circuitry 708, communication circuitry 705, and the other components of computer device 700. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 706), ports, slots, jumpers, interconnect modules, receptacles, modular connectors, etc. The I/O circuitry 718 may couple the device 700 with the one or more sensors 714, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 714 may be any device configured to detect events or environmental changes, convert the detected events into electrical signals and/or digital data, and transmit/send the signals/data to the computer device 700. Some of the one or more sensors 714 may be sensors used for providing computer-generated sensory inputs. Some of the one or more sensors 714 may be sensors used for motion and/or object detection. Examples of such one or more sensors 714 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 714 may include a lens-less image capture mechanism comprising an array of aperture elements, wherein light passing through the array of aperture elements define the pixels of an image. In embodiments, the motion detection one or more sensors 714 may be coupled with or associated with light generating devices, for example, one or more infrared projectors to project a grid of infrared light onto a scene, where an infrared camera may record reflected infrared light to compute depth information.

Some of the one or more sensors 714 may be used for position and/or orientation detection, ambient/environmental condition detection, and the like. Examples of such one or more sensors 714 may include, inter alia, microelectromechanical systems (MEMS) with piezoelectric, piezoresistive and/or capacitive components, which may be used to determine environmental conditions or location information related to the computer device 700. In embodiments, the MEMS may include 3-axis accelerometers, 3-axis gyroscopes, and/or magnetometers. In some embodiments, the one or more sensors 714 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 702, the hardware accelerator 703, the memory 704, the data storage circuitry 708 including the modules 709, the input/output interface 718, the one or more sensors 714, the communication circuitry 705 including the Tx 711, and the NIC 712, and the system bus 706, may perform its conventional functions known in the art. In addition, they may be employed to store and host execution of programming instructions implementing the operations associated with operations to be performed by an apparatus for computer assisted or autonomous driving, as described in connection with FIGS. 1-6, and/or other functions that provides the capability of the embodiments described in the current disclosure. The various elements may be implemented by assembler instructions supported by processor(s) 702 or high-level languages, such as, for example, C, that can be compiled into such instructions. Operations associated with the device 700 not implemented in software may be implemented in hardware, e.g., via hardware accelerator 703.

The number, capability and/or capacity of these elements 702-723 may vary, depending on the number of other devices the device 700 is configured to support. Otherwise, the constitutions of elements 702-723 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 8:
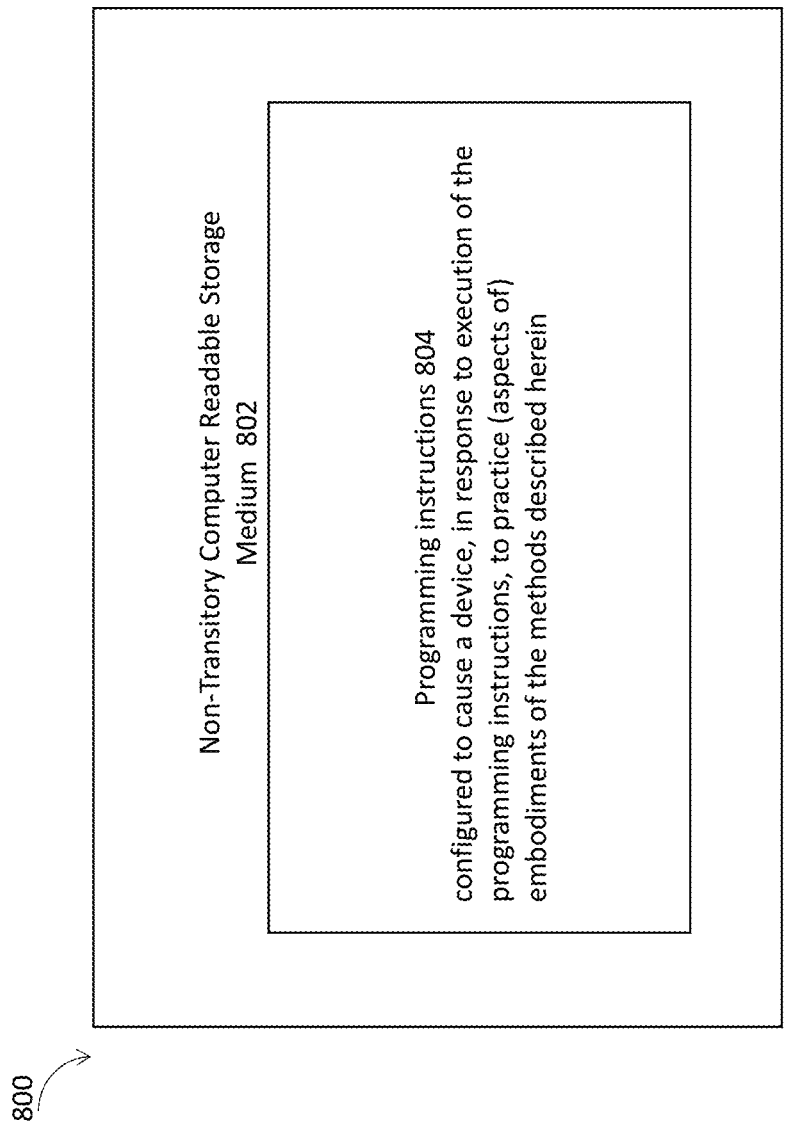
FIG. 8 illustrates a storage medium having instructions for practicing methods described with references to FIGS. 1-6, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., device 800, in response to execution of the programming instructions, to perform, e.g., various operations associated with an apparatus for computing including a computing device having an on-screen input interface controller to receive an on-screen input from an on-screen input device, and also an off-screen input from an off-screen input support device, as shown in FIGS. 1-7.

In alternate embodiments, programming instructions 804 may be disposed on multiple computer-readable non-transitory storage media 802 instead. In alternate embodiments, programming instructions 804 may be disposed on computer-readable transitory storage media 802, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for computing, comprising: an on-screen input interface controller co-located with a display screen of a computing device, to process an on-screen input provided via an interaction between an on-screen input device and the display screen; and a receiver co-located with the display screen to wirelessly receive an off-screen input from an off-screen input support device of the computing device, separately located from the display screen; wherein the on-screen input interface controller is to further process the off-screen input received by the receiver.

Example 2 may include the apparatus of example 1 and/or some other examples herein, wherein the receiver is to wirelessly receive the off-screen input in accordance with a wireless protocol selected from one of a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, a dedicated short range communications (DSRC) protocol, or a wireless universal serial bus (USB) protocol.

Example 3 may include the apparatus of example 1 and/or some other examples herein, wherein the on-screen input interface controller is to receive the on-screen input in a first time slot or a first frequency, and to receive the off-screen input in a second time slot or a second frequency.

Example 4 may include the apparatus of example 1 and/or some other examples herein, wherein the display screen is a selected one of a resistive touchscreen, a capacitive touchscreen, an infrared touchscreen, an optical touchscreen, a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

Example 5 may include the apparatus of example 1 and/or some other examples herein, wherein the on-screen input device is a selected one of a user finger, a stylus, or a virtual keyboard.

Example 6 may include the apparatus of any one of examples 1-5 and/or some other examples herein, wherein the off-screen input support device includes: an off-screen input device to generate the off-screen input, and a transmitter coupled to the off-screen input device to wirelessly transmit the off-screen input to the receiver.

Example 7 may include the apparatus of example 6 and/or some other examples herein, wherein the off-screen input device is a selected one of a keyboard, a trackpad, a mouse, a track ball, a joy stick, or another display screen removably coupled with the display screen.

Example 8 may include the apparatus of example 6 and/or some other examples herein, wherein the off-screen input device is a first off-screen input device, and the off-screen input support device further includes: a second off-screen input device, wherein the second off-screen input device is to generate a second off-screen input to be transmitted by the transmitter to the receiver through the wireless protocol.

Example 9 may include the apparatus of example 6 and/or some other examples herein, wherein the off-screen input support device further includes an off-screen input interface controller coupled to the off-screen input device and the transmitter, and the off-screen input interface controller is to generate the off-screen input compatible to the on-screen input.

Example 10 may include the apparatus of example 6 and/or some other examples herein, wherein the transmitter is a touch sensing element located in a location of the off-screen input support device to control a capacitance of the touch sensing element by a tilting degree of the off-screen input support device with respect to the computing device.

Example 11 may include the apparatus of example 6 and/or some other examples herein, wherein the transmitter is a first sensing element, the receiver is a second sensing element capacitively coupled to the first sensing element, the transmitter is to transmit the off-screen input to the receiver through capacitive coupling between the first sensing element and the second sensing element.

Example 12 may include the apparatus of example 6 and/or some other examples herein, wherein the computing device is a computing tablet, the off-screen input support device is a keyboard base, the on-screen input device is a stylus, the off-screen input device is a keyboard, and the transmitter and the receiver are two touch sensing elements.

Example 13 may include the apparatus of any one of examples 1-5 and/or some other examples herein, wherein the apparatus is the computing device having at least the display screen, the on-screen input interface controller, and the receiver, or the computing device having at least a main processor located at the off-screen input support device.

Example 14 may include the apparatus of example 13 and/or some other examples herein, wherein the computing device is a computing tablet.

Example 15 may include the apparatus of any one of examples 1-5 and/or some other examples herein, wherein the apparatus is a detachable 2 in 1 device comprising at least the computing device, the display screen, the on-screen input interface controller, and the receiver.

Example 16 may include an apparatus for computing, comprising: an off-screen input device to generate an off-screen input for a computing device, wherein the off-screen input device is separately located from a display screen of the computing device; a transmitter coupled to the off-screen input device to wirelessly transmit the off-screen input to a receiver co-located with the display screen to receive the off-screen input, wherein the off-screen input is to be processed by an on-screen input interface controller co-located with the display screen of the computing device.

Example 17 may include the apparatus of example 16 and/or some other examples herein, wherein the on-screen input interface controller is further to process an on-screen input provided via an interaction between an on-screen input device and the display screen.

Example 18 may include the apparatus of example 16 and/or some other examples herein, wherein the off-screen input device is a first off-screen input device, and the apparatus further includes: a second off-screen input device, wherein the second off-screen input device is to generate a second off-screen input to be transmitted by the transmitter to the receiver through the wireless protocol.

Example 19 may include the apparatus of example 16 and/or some other examples herein, further comprising: an off-screen input interface controller coupled to the off-screen input device and the transmitter, and the off-screen input interface controller is to generate the off-screen input compatible to the on-screen input interface controller.

Example 20 may include the apparatus of example 16 and/or some other examples herein, wherein the off-screen input device is a selected one of a keyboard, a trackpad, a mouse, a track ball, a joy stick, or another display screen removably coupled with the display screen.

Example 21 may include the apparatus of example 16 and/or some other examples herein, wherein the computing device is a computing tablet, the apparatus is a keyboard base, the off-screen input device is a keyboard, and the transmitter and the receiver are two touch sensing elements.

Example 22 may include the apparatus of example 16 and/or some other examples herein, wherein the computing device has at least a main processor coupled to the off-screen input device.

Example 23 may include the apparatus of any one of examples 16-22 and/or some other examples herein, wherein the apparatus is a detachable 2 in 1 device comprising at least the computing device, the display screen, the on-screen input interface controller, the transmitter, and the off-screen input device.

Example 24 may include an apparatus for computing, comprising: an on-screen input interface controller co-located with a display screen of a computing device, and a virtual device interface to operate on the on-screen input interface controller to: process an on-screen input provided via an interaction between an on-screen input device and the display screen; and process an off-screen input provided by an off-screen input support device of the computing device, separately located from the display screen.

Example 25 may include the apparatus of example 24 and/or some other examples herein, wherein the virtual device interface is to process the on-screen input in a first time slot or a first frequency, and to process the off-screen input in a second time slot or a second frequency.

Example 26 may include the apparatus of example 24 and/or some other examples herein, wherein the virtual device interface is a firmware to operate on the on-screen input interface controller.

Example 27 may include the apparatus of example 24 and/or some other examples herein, wherein the on-screen input device is a selected one of a user finger, a stylus, or a virtual keyboard.

Example 28 may include the apparatus of any one of examples 24-27 and/or some other examples herein, wherein the off-screen input support device includes: an off-screen input device to generate the off-screen input, and a transmitter coupled to the off-screen input device to wirelessly transmit the off-screen input to a receiver co-located with the display screen.

Example 29 may include the apparatus of example 28 and/or some other examples herein, wherein the off-screen input device is a selected one of a keyboard, a trackpad, a mouse, a track ball, a joy stick, or another display screen removably coupled with the display screen.

Example 30 may include the apparatus of example 28 and/or some other examples herein, wherein the computing device is a computing tablet, the off-screen input support device is a keyboard base, the on-screen input device is a stylus, the off-screen input device is a keyboard, and the transmitter and the receiver are two touch sensing elements.

Example 31 may include the apparatus of example 28 and/or some other examples herein, wherein the apparatus is the computing device having at least the display screen, the on-screen input interface controller, and the receiver.

Example 32 may include the apparatus of example 28 and/or some other examples herein, wherein the computing device is a computing tablet.

Example 33 may include the apparatus of any one of examples 24-27 and/or some other examples herein, wherein the apparatus is a detachable 2 in 1 device comprising at least the computing device, the display screen, and the on-screen input interface controller.

Example 34 may include a method for processing inputs to a computing system, comprising: receiving an on-screen input provided via an interaction between an on-screen input device and a display screen of a computing device; processing, by an on-screen input interface controller co-located with the display screen, the on-screen input; receiving, by a receiver co-located with the display screen, in accordance with a wireless protocol, an off-screen input, wherein the off-screen input is generated by an off-screen input device of the computing device, separately located from the display screen; and processing, by the on-screen input interface controller coupled to the receiver, the off-screen input.

Example 35 may include the method of example 34 and/or some other examples herein, wherein the wireless protocol includes a selected one of a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, a dedicated short range communications (DSRC) protocol, or a wireless universal serial bus (USB) protocol.

Example 36 may include the method of any one of examples 34-35 and/or some other examples herein, wherein the off-screen input device includes a selected one of a keyboard, a trackpad, a mouse, a track ball, a joy stick, or another display screen removably coupled with the display screen.

Example 37 may include the method of any one of examples 34-35 and/or some other examples herein, wherein the on-screen input interface controller is to process the on-screen input in a first time slot or a first frequency, and to process the off-screen input in a second time slot or a second frequency.

Example 38 may include the method of any one of examples 34-35 and/or some other examples herein, wherein the on-screen input device includes a selected one of a user finger, a stylus, or a virtual keyboard.

Example 39 may include one or more computer-readable media having instructions for processing inputs to a computing system, upon execution of the instructions by one or more processors, to perform the method of any one of examples 34-38.

Example 40 may include an apparatus for processing inputs to a computing system, comprising: means for receiving an on-screen input provided via an interaction between an on-screen input device and a display screen of a computing device; means for processing, by an on-screen input interface controller co-located with the display screen, the on-screen input; means for receiving, by a receiver co-located with the display screen, in accordance with a wireless protocol, an off-screen input, wherein the off-screen input is generated by an off-screen input device of the computing device, separately located from the display screen; and means for processing, by the on-screen input interface controller coupled to the receiver, the off-screen input.

Example 41 may include the apparatus of example 40 and/or some other examples herein, wherein the wireless protocol includes a selected one of a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, a dedicated short range communications (DSRC) protocol, or a wireless universal serial bus (USB) protocol.

Example 42 may include the apparatus of any one of examples 40-41 and/or some other examples herein, wherein the off-screen input device includes a selected one of a keyboard, a trackpad, a mouse, a track ball, a joy stick, or another display screen removably coupled with the display screen.

Example 43 may include the apparatus of any one of examples 40-41 and/or some other examples herein, wherein the on-screen input interface controller is to process the on-screen input in a first time slot or a first frequency, and to process the off-screen input in a second time slot or a second frequency.

Example 44 may include the apparatus of any one of examples 40-41 and/or some other examples herein, wherein the on-screen input device includes a selected one of a user finger, a stylus, or a virtual keyboard.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An apparatus for computing, comprising: a display screen of a computing device and a keyboard detachably coupled with each other, the detachable keyboard having a transmitter to transmit inputs from the keyboard;
an on-screen input interface controller co-located with the display screen;
a receiver co-located with the display screen and coupled with the on-screen input interface controller to wirelessly receive the inputs from the detachable keyboard and an off-screen input from an off-screen input support device of the computing device, separately located from the apparatus; and
a firmware to be operated on the on-screen input interface controller, wherein the firmware includes a virtual device interface, and
wherein the virtual device interface is to process an on-screen input provided via an interaction between an on-screen input device and the display screen, and to further process the inputs from the detachable keyboard and the off-screen input received by the receiver.

2. The apparatus of claim 1, wherein the receiver is to wirelessly receive the off-screen input in accordance with a wireless protocol selected from one of a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, a dedicated short range communications (DSRC) protocol, or a wireless universal serial bus (USB) protocol.

3. The apparatus of claim 1, wherein the on-screen input interface controller is to receive the on-screen input in a first time slot or a first frequency, and to receive the off-screen input in a second time slot or a second frequency.

4. The apparatus of claim 1, wherein the display screen is a selected one of a resistive touchscreen, a capacitive touchscreen, an infrared touchscreen, an optical touchscreen, a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

5. The apparatus of claim 1, wherein the on-screen input device is a selected one of a user finger, a stylus, or a virtual keyboard.

6. The apparatus of claim 1, wherein the off-screen input support device includes:
an off-screen input device to generate the off-screen input, and
a transmitter coupled to the off-screen input device to wirelessly transmit the off-screen input to the receiver.

7. The apparatus of claim 6, wherein the off-screen input device is a selected one of a keyboard, a trackpad, a mouse, a track ball, a joy stick, or another display screen removably coupled with the display screen.

8. The apparatus of claim 6, wherein the off-screen input device is a first off-screen input device, and the off-screen input support device further includes:
a second off-screen input device, wherein the second off-screen input device is to generate a second off-screen input to be transmitted by the transmitter to the receiver through a wireless protocol.

9. The apparatus of claim 6, wherein the off-screen input support device further includes an off-screen input interface controller coupled to the off-screen input device and the transmitter, and the off-screen input interface controller is to generate the off-screen input compatible to the on-screen input.

10. The apparatus of claim 6, wherein the transmitter is a touch sensing element located in a location of the off-screen input support device to control a capacitance of the touch sensing element by a tilting degree of the off-screen input support device with respect to the computing device.

11. The apparatus of claim 6, wherein the transmitter is a first sensing element, the receiver is a second sensing element capacitively coupled to the first sensing element, the transmitter is to transmit the off-screen input to the receiver through capacitive coupling between the first sensing element and the second sensing element.

12. The apparatus of claim 6, wherein the computing device is a computing tablet, the off-screen input support device is a keyboard base, the on-screen input device is a stylus, the off-screen input device is a keyboard, and the transmitter and the receiver are two touch sensing elements.

13. The apparatus of claim 1, wherein the apparatus is the computing device having at least a main processor, the display screen, the on-screen input interface controller, and the receiver, or the computing device having at least a main processor located at the off-screen input support device.

14. The apparatus of claim 13, wherein the computing device is a computing tablet.

15. The apparatus of claim 1, wherein the apparatus is a detachable 2 in 1 device comprising at least the computing device, the display screen, the on-screen input interface controller, and the receiver.

16. An apparatus for computing, comprising:
an off-screen input device to generate an off-screen input for a computing device, wherein the off-screen input device is separately located from a display screen of the computing device;
a transmitter coupled to the off-screen input device to wirelessly transmit the off-screen input to a receiver co-located with the display screen to receive the off-screen input, wherein the off-screen input is to be processed by an on-screen input interface controller co-located with the display screen of the computing device; and
one or more wires to couple the off-screen input device with the computing device to provide power for the off-screen input device.

17. The apparatus of claim 16, wherein the on-screen input interface controller is further to process an on-screen input provided via an interaction between an on-screen input device and the display screen.

18. The apparatus of claim 16, wherein the off-screen input device is a first off-screen input device, and the apparatus further includes:
a second off-screen input device, wherein the second off-screen input device is to generate a second off-screen input to be transmitted by the transmitter to the receiver through a wireless protocol.

19. The apparatus of claim 16, further comprising:
an off-screen input interface controller coupled to the off-screen input device and the transmitter, and the off-screen input interface controller is to generate the off-screen input compatible to the on-screen input interface controller.

20. The apparatus of claim 16, wherein the off-screen input device is a selected one of a keyboard, a trackpad, a mouse, a track ball, a joy stick, or another display screen removably coupled with the display screen.

21. The apparatus of claim 16, wherein the computing device is a computing tablet, the apparatus is a keyboard base, the off-screen input device is a keyboard, and the transmitter and the receiver are two touch sensing elements.

22. The apparatus of claim 16, wherein the computing device has at least a main processor coupled to the off-screen input device.

23. The apparatus of claim 16, wherein the apparatus is a detachable 2 in 1 device comprising at least the computing device, the display screen, the on-screen input interface controller, the transmitter, and the off-screen input device.

24. An apparatus for computing, comprising:
an on-screen input interface controller co-located with a display screen of a computing device, and
a virtual device interface to operate on the on-screen input interface controller to:
process an on-screen input provided via an interaction between an on-screen input device and the display screen; and
process an off-screen input provided by an off-screen input support device of the computing device, separately located from the display screen, wherein one or more wires are to couple the computing device with the off-screen input support device to provide power for the off-screen input support device.

25. The apparatus of claim 24, wherein the virtual device interface is to process the on-screen input in a first time slot or a first frequency, and to process the off-screen input in a second time slot or a second frequency.

* * * * *